(12) United States Patent
Keita et al.

(10) Patent No.: US 8,590,400 B2
(45) Date of Patent: Nov. 26, 2013

(54) VIBRATION TYPE FLOW MONITORING APPARATUS INCLUDING A SEPARATING UNIT ARRANGED IN THE MEASURING PIPE

(75) Inventors: Mamadi Keita, Basel (CH); Mike Touzin, Hollstein (DE)

(73) Assignee: Endress + Hauser Flowtec AG, Reinach (CH)

( * ) Notice: Subject to any disclaimer, the term of this patent is extended or adjusted under 35 U.S.C. 154(b) by 421 days.

(21) Appl. No.: 12/996,402

(22) PCT Filed: Jun. 2, 2009

(86) PCT No.: PCT/EP2009/056728
§ 371 (c)(1),
(2), (4) Date: Dec. 6, 2010

(87) PCT Pub. No.: WO2009/147130
PCT Pub. Date: Dec. 10, 2009

(65) Prior Publication Data
US 2011/0088486 A1    Apr. 21, 2011

(30) Foreign Application Priority Data

Jun. 4, 2008   (DE) .......................... 10 2008 002 217

(51) Int. Cl.
*G01F 1/84*    (2006.01)
(52) U.S. Cl.
USPC ................................. 73/861.355; 73/861.357
(58) Field of Classification Search
None
See application file for complete search history.

(56) References Cited

U.S. PATENT DOCUMENTS

| | | | |
|---|---|---|---|
| 4,876,898 A * | 10/1989 | Cage et al. ............... | 73/861.355 |
| 5,347,874 A | 9/1994 | Kalotay | |
| 5,448,921 A | 9/1995 | Cage | |
| 5,861,561 A * | 1/1999 | Van Cleve et al. ......... | 73/861.52 |
| 6,450,042 B1 * | 9/2002 | Lanham et al. ........... | 73/861.357 |
| 2005/0155437 A1 * | 7/2005 | Bitto et al. ............... | 73/861.355 |
| 2007/0151368 A1 * | 7/2007 | Hussain et al. ........... | 73/861.357 |
| 2009/0266177 A1 * | 10/2009 | Hussain et al. ........... | 73/861.357 |

FOREIGN PATENT DOCUMENTS

| | | |
|---|---|---|
| DE | 698 18 974 T2 | 9/2004 |
| JP | 06201427 A | 7/1994 |
| JP | 09133564 A | 5/1997 |
| JP | 11037820 A | 2/1999 |
| WO | WO 98/38479 | 9/1998 |
| WO | WO 01/65213 A1 | 9/2001 |
| WO | WO 02/44660 A2 | 6/2002 |
| WO | WO 2008/059262 A1 | 5/2008 |

* cited by examiner

*Primary Examiner* — Harshad R Patel
(74) *Attorney, Agent, or Firm* — Bacon & Thomas, PLLC

(57) ABSTRACT

An apparatus for determining and/or monitoring at least one flow parameter of a medium, wherein the medium flows through at least one measuring tube essentially along an imaginary flow axis, wherein at least one exciter transducer element is provided, which, based on an exciter signal, excites the measuring tube to mechanical oscillations, and wherein at least one receiver transducer element is provided, which receives mechanical oscillations of the measuring tube as a received signal. The invention includes that at least one separating unit is provided, and that the separating unit is embodied and arranged in the measuring tube in such a manner, that at least two sub measuring tubes result in the measuring tube, wherein the medium flows through the at least two sub measuring tubes essentially along the imaginary flow axis.

9 Claims, 6 Drawing Sheets

VIBRATION TYPE FLOW MONITORING APPARATUS INCLUDING A SEPARATING UNIT ARRANGED IN THE MEASURING PIPE

TECHNICAL FIELD

The invention relates to an apparatus for determining and/or monitoring at least one flow parameter of a medium, wherein the medium flows through at least one measuring tube essentially along an imaginary flow axis, wherein at least one exciter transducer element is provided, which, based on an exciter signal, excites the measuring tube to mechanical oscillations, and wherein at least one receiver transducer element is provided, which receives mechanical oscillations of the measuring tube as a received signal.

BACKGROUND DISCUSSION

The flow parameter is, for example, the volume flow or mass flow of the medium. The medium is, for example, a liquid, a gas, generally a fluid, or a bulk good. Furthermore, the medium is, for example, a mixture of liquid, gas or bulk good.

In the state of the art, it is known to determine flow parameters, e.g. the flow rate of a medium through a measuring tube, by taking advantage of the Coriolis effect. For this, the measuring tube is excited to mechanical oscillations. At a point different from the excitation location, the oscillations of the measuring tube are recorded. From the phase difference between the excitation signal and the received signal or the travel time associated therewith, the flow parameter can then be ascertained.

In the state of the art, different designs are known for the measuring tube, through which the medium flows. Thus, there are both curved tubes, as well as straight tubes. Furthermore, there can be a single measuring tube or, for example, two, or more measuring tubes.

Especially in the case of application of a plurality of tubes, there results the problem of pressure drop when the medium transitions from a pipe with a greater diameter into the region of two tubes of a smaller diameter. Two tubes, in contrast, have the advantage in comparison with single tubes that they are symmetrical, and, thus, can be more easily balanced, which increases the accuracy of measurement.

SUMMARY OF THE INVENTION

An object of the invention is to provide an apparatus for determining and/or monitoring a flow parameter, wherein the apparatus has a measuring unit, which avoids the problem of the pressure drop, while simultaneously being as symmetrical as possible and thus easy to balance.

The object is achieved according to the invention by the features that at least one separating unit is provided, and that the separating unit is embodied and arranged in the measuring tube in such a manner, that at least two sub measuring tubes result in the measuring tube, wherein the medium flows through the at least two sub measuring tubes essentially along the imaginary flow axis. The measuring tube serves especially for measuring the flow parameter (e.g. volume—or mass flow or the density of the medium flowing through the measuring tube) by making use of the Coriolis measuring principle. The measuring tube is, according to the invention, virtually divided in two by a separating unit, i.e. the medium flows through the two sub measuring tubes, which essentially represent the inner cross section of the measuring tube. The pressure drop is removed by the fact that the medium is brought into the measuring tube—except for the cross section of the separating unit—via the full cross section. Since no constriction takes place, there also is no pressure drop. In an embodiment, exactly one measuring tube is provided. The measuring tube is, in an embodiment, installed, without flanges, into a pipeline, or into a system of pipes, conveying the medium.

An embodiment provides that the separating unit is embodied and arranged in the measuring tube in such a manner, that the at least two sub measuring tubes essentially have equal volumes, through which the medium flows. The medium thus flows in both sub measuring tubes through the equal internal volumes. In other words, the separating unit is embodied and arranged in the measuring tube in such a manner, that the cross sections of the sub measuring tubes in a plane perpendicular to the flow axis are essentially equal.

An embodiment includes that the separating unit essentially involves at least one plate of a predeterminable thickness, wherein the plate is arranged along an inner diameter of the measuring tube.

An embodiment provides that the separating unit essentially involves at least two plates, which have a predeterminable distance from one another. In this embodiment, the outside of each sub measuring tube is thus virtually composed of a section of the actual measuring tube and a plate. In one embodiment, the two plates are embodied and arranged with respect to one another in such manner, that the measuring tube sections of the sub measuring tubes again have a tube-like perimeter. Depending on the choice of the distance between the plates, an oval shape can, in such case, also result.

An embodiment provides that the measuring tube is embodied essentially cylindrically. In an embodiment, the measuring tube is embodied so as to be straight along the imaginary flow axis and thus has no curvatures.

An embodiment includes that the outer thickness of the separating unit is smaller than the wall thickness of the measuring tube. In this embodiment, the separating unit is thus thin compared with the thickness of the measuring tube.

An embodiment includes that the measuring tube inflow and/or outflow side are/is free of flanges. The measuring tube thus involves a so-called wafer, which is clamped between the flanges of a pipe system. In such case, the measuring tube itself has, in an embodiment, no flanges, i.e. neither on the inflow nor on the outflow side.

An embodiment includes that at least the receiver transducer element and/or the exciter transducer element are/is at least partially arranged in the separating unit.

An embodiment provides that the measuring tube is embodied as one piece. In this one-piece measuring tube, the separating unit is thus already a component or is installed in a method step. In other words, in an embodiment, the measuring tube is one piece before the introduction of the separating unit, or the measuring tube is one piece subsequently, e.g. in connection with the separating unit. Alternatively thereto, the measuring tube is composed of two sub pieces.

An embodiment includes that the measuring tube is essentially composed of at least two tube halves. In connection with the separating unit, there then results the complete measuring tube. The tube halves are, in such case, embodied in an essentially half shell like manner.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
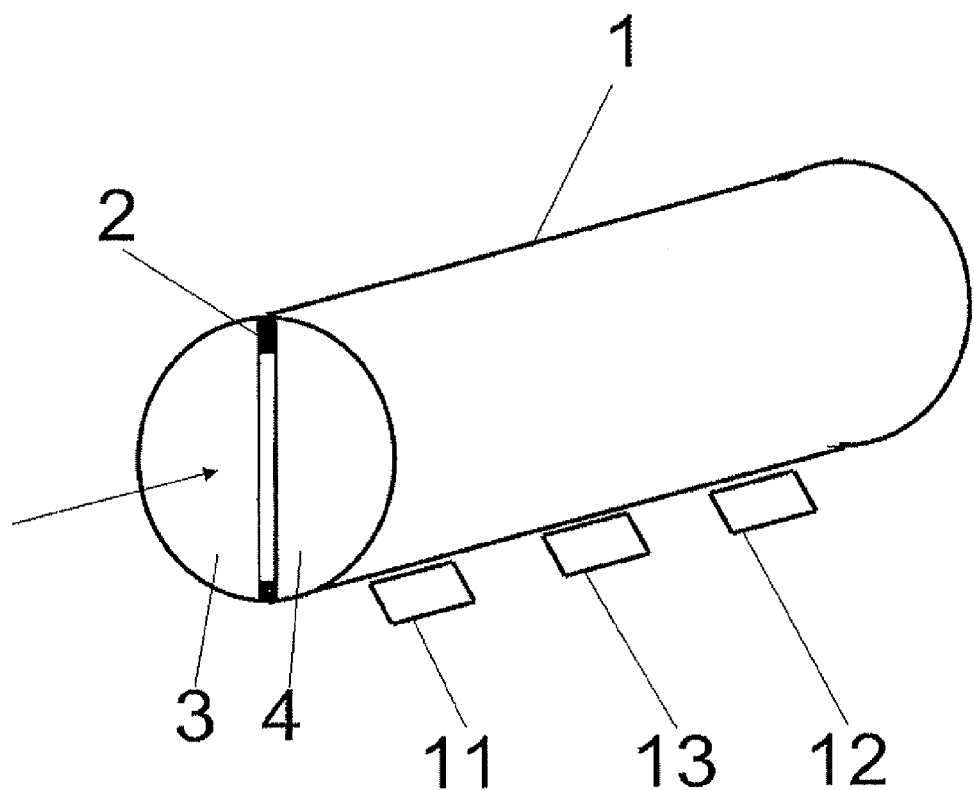
FIG. 1 is a spatial representation of a measuring tube of the invention.

FIG. 1 shows a spatial representation of a measuring tube 1 of the invention. The tube 1, here embodied cylindrically and straight, is flowed through by the medium (not shown here) in the direction of the arrow along an imaginary flow axis. For this, the tube 1 is, for example, connected at the outlet and inlet sides with a pipe system. As seen here, the tube 1 is free of flanges, i.e. the tube itself has no flanges.

The tube 1 is excited by the exciter transducer element 13 to mechanical oscillations, which, in turn, are received by the receiver transducer elements 11, 12 and converted to electrical, received signals. From the phase difference between these two signals and the exciter signal—for example, by making use of the Coriolis effect—the volume flow of the medium can be ascertained as its flow parameter. Furthermore, determining density or mass flow is also possible.

Located in the measuring tube 1 of the invention is a separating unit 2, which divides the tube 1 into two sub measuring tubes 3, 4. The separating unit 2 is here a plate, which divides the tube 1, preferably along its whole length; i.e. the depth of the separating unit 2 is preferably essentially equal to the length of the tube 1. The length of the separating unit 2 is preferably essentially equal to the inner diameter of the measuring tube 1. The width, or thickness, of the separating unit 1 is predeterminable, and defines a certain dead space, which is not flowed through by the medium. This intermediate space is—as demonstrated in a following illustration—used, for example, for accommodating the oscillation transducer; i.e. additional constructive tasks are transferred to the intermediate space in the separating unit 2. The separating unit 2, embodied as a plate, can, in such case, be embodied solidly, or, as presented in FIG. 1, in turn, have a hollow space itself.

Through the separating unit 2, the cylinder of the measuring tube 1 is divided into two half-shells, which preferably have equal flowable volume. Thus, a pressure drop can also be prevented if the diameter of the measuring tube 1 is equal to or at least not smaller than the diameter of the pipe which conveys the medium to the measuring tube and which, thus, is also connected with the measuring tube 1.

A method for manufacture of a measuring tube 1 for determining and/or monitoring at least one flow parameter of a medium, which flows through the measuring tube 1, comprises, in such case, that an essentially cylindrically embodied tube is separated perpendicularly to a tube cross section into two parts, and that a separating unit is inserted between the two parts. In an additional embodiment, the separating unit is inserted into an existing, one-piece measuring tube. In an alternative embodiment, the measuring tube is composed of two half shells, between which the separating unit is arranged, wherein the separating unit, in turn, is composed of two subunits, which, in given cases, have a certain spacing from one another. These subunits are, in such case, either connected with one another or independent of one another.

Figure 2:
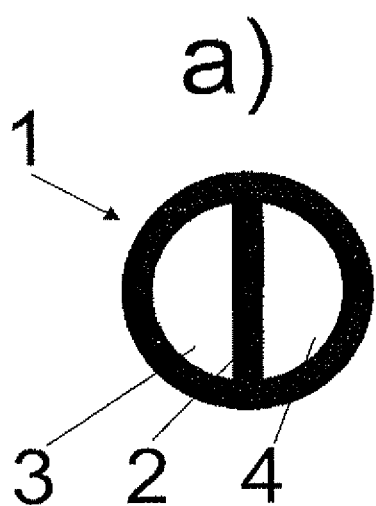
FIG. 2a, FIG. 2b and FIG. 2c are cross sections of three different embodiments of a measuring tube.
Figure 2:
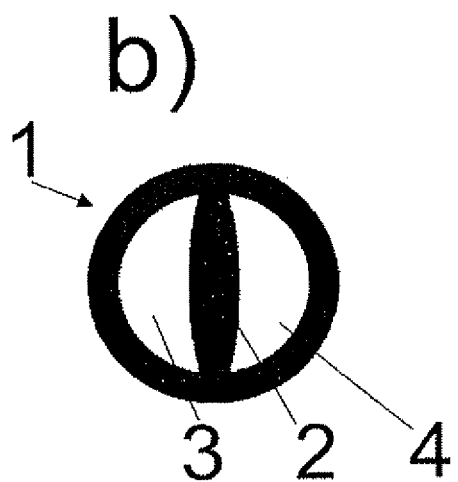
Figure 2:
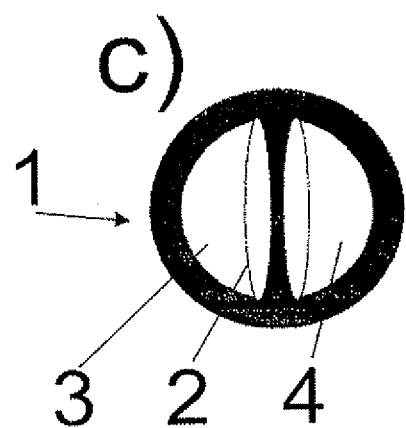

The three FIGS. 2a, 2b and 2c show variants for the embodiment of the separating unit, through which result different cross sections of the measuring tube 1 and, respectively, the sub measuring tubes 3, 4.

In FIG. 2a, the separating unit 2 has a consistently uniform wall thickness. Thus, the separating unit 2—in this embodiment of FIG. 2a—corresponds to an inner diameter of the measuring tube 1 embodied with a certain thickness. Through this thickened, inner diameter, the tube 1 is divided into the two sub measuring tubes 3, 4.

In FIG. 2b, the separating unit 2 has a bulged structure, i.e. the thickness in the middle of the separating unit 2 is greater than the thickness in the direction of the inner wall of the measuring tube 1. The separating unit 2 is thus embodied concavely.

FIG. 2c shows a convex variant, in which the separating unit 2 has in its center a smaller wall thickness.

In an additional embodiment (not shown here), along the measuring tube 1—i.e. along the imaginary flow axis—the separating unit 2 is embodied in a varying manner, so that, for example, the wall thickness of the separating unit 2 is not constant along the measuring tube 1, but instead varies.

The separating unit is thus flat in a cross sectional plane of the measuring tube or in a plane perpendicular to the imaginary flow axis, or it has a contour, or it has a uniform thickness or a varying thickness. Correspondingly, the separating unit can, in each case, also be embodied identically or differently along the imaginary flow axis.

Generally, the thickness of the separating unit 2 can be different from the wall thickness of the measuring tube 1. In such case, the separating unit 2 is, in the illustrated variants, in each case solid. In an alternative form, cavities or hollow spaces are also present in the separating unit 2.

Figure 3:
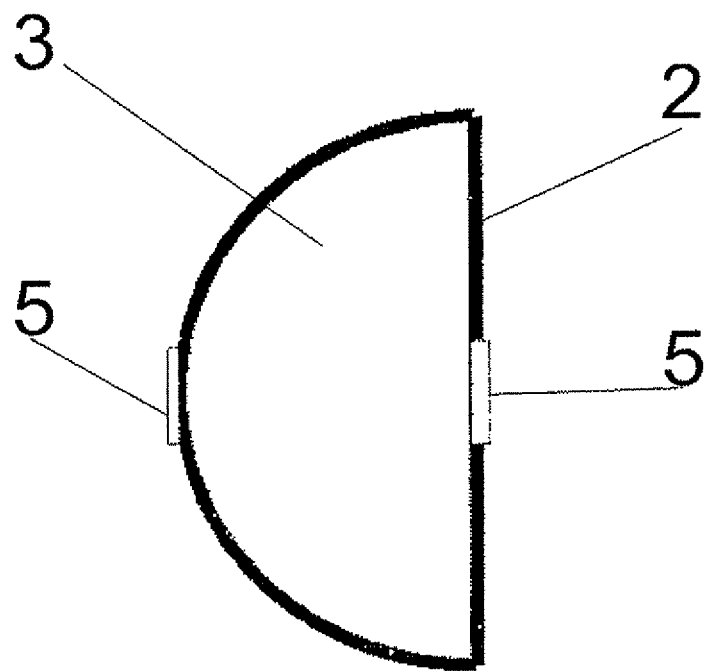
FIG. 3 is a cross section of a half of a measuring tube of the invention.

FIG. 3 shows a half of a measuring tube 1 in the form of the sub measuring tube 3. The second sub measuring tube, which is not presented here, is, in such case, preferably equally embodied and furthermore preferably arranged mirror symmetrically to the here illustrated sub measuring tube 3. The oscillatory behavior of the sub measuring tube 3 is tuned by two stiffening elements 5 by changing the stiffness of the separating unit 2, and, respectively, the section of the measuring tube 1 comprising the sub measuring tube 3. In such case, the stiffening element 5 is, for example, in each case, a strip of reinforcing material extending along the length of the measuring tube 1—one strip on the outer edge of the measuring tube 1 and one on the separating unit 2.

Figure 4:
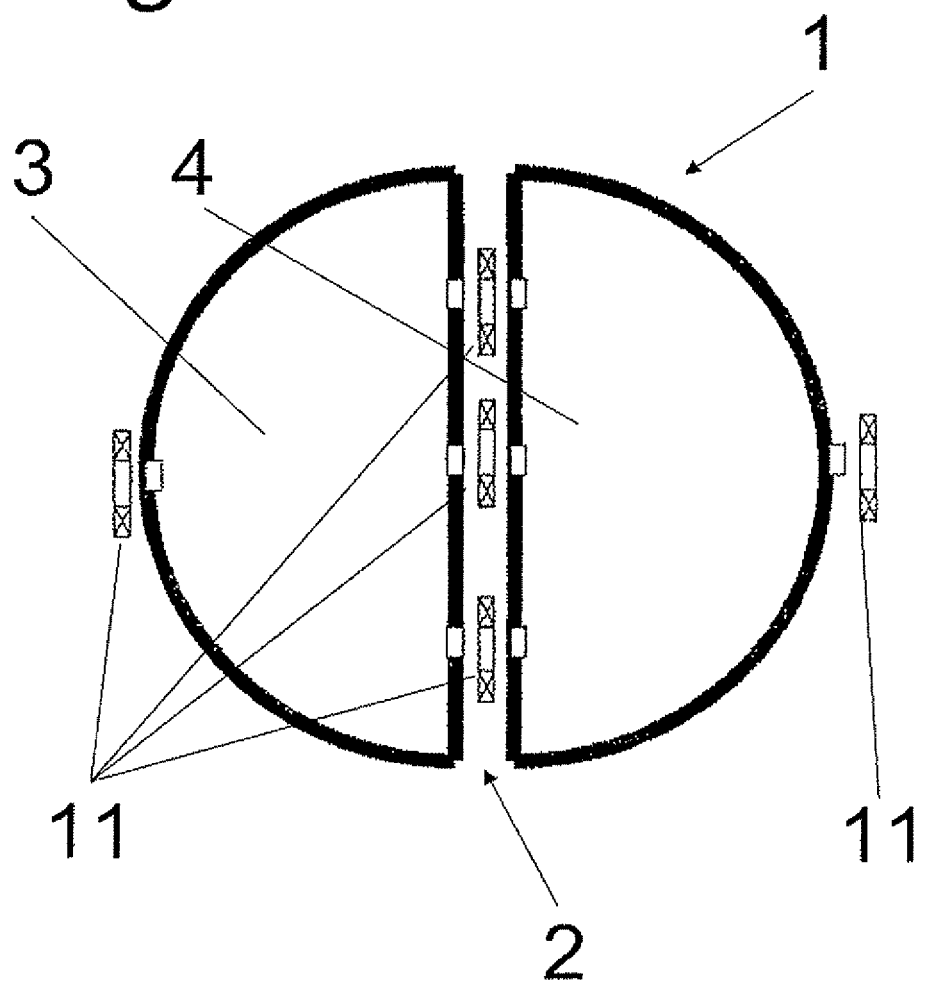
FIG. 4 is a cross section of an arrangement of a measuring tube of the invention with exciter and receiver transducer elements.

In FIG. 4, the separating unit 2 is essentially composed of two plates of a predeterminable wall thickness, which have a likewise predeterminable distance from one another. For the measuring tube 1 as a whole, there results therewith an oval cross section, which, however, is in such case furthermore formed from two half circles. At the transition to the pipe system conveying the medium, the sub tubes are then suitably led back together. Altogether, five receiver transducer elements 11 are shown, which, at this point of the measuring tube 1, record the oscillations of the measuring tube 1 and convert these into electrical signals. In such case, the individual receiver transducer elements 11 are, in this embodiment, in each case composed of a magnet, which is secured on the measuring tube 1 or on the separating unit 2, and which is moved in the magnetic field of a coil by the oscillations of the measuring tube 1. In an additional variant (not shown here), the two "sub plates" of the separating unit 2 are connected with one another and, respectively, mechanically coupled with one another.

Through the separating unit 2, there thus result additional options for positioning the transducer elements for producing and, respectively, detecting the oscillations. Furthermore, an element for producing a pressure equalization can also be provided in the separating unit 2. Furthermore, the measuring tube 1 is also surrounded by a housing (not shown here), which, for example, is itself tubular.

The invention claimed is:

1. An apparatus for determining and/or monitoring at least one flow parameter of a medium, said apparatus comprising:
   at least one measuring tube through which medium flows essentially along an imaginary flow axis;
   at least one exciter transducer element, which, based on an exciter signal, excites said measuring tube to mechanical oscillations;
   at least one receiver transducer element, which receives mechanical oscillations of said measuring tube as a received signal; and
   at least one separating unit, wherein:
   said separating unit being embodied and arranged in said measuring tube in such a manner, that at least two sub measuring tubes result in said measuring tube;
   medium flows through said at least two sub measuring tubes essentially along an imaginary flow axis; and
   said separating unit essentially involves at least one plate of a predeterminable thickness, which plate is arranged along an inner diameter of said measuring tube.

2. The apparatus as claimed in claim 1, wherein:
   said separating unit is embodied and arranged in said measuring tube in such a manner, that said at least two sub measuring tubes essentially exhibit equal volumes, through which the medium flows.

3. The apparatus as claimed in claim 1, wherein:
   said separating unit essentially involves at least two plates, which exhibit a predeterminable separation from one another.

4. The apparatus as claimed in claim 1, wherein:
   said measuring tube is embodied essentially cylindrically.

5. The apparatus as claimed in claim 1, wherein:
   the outer thickness of said separating unit is smaller than the wall thickness of said measuring tube.

6. The apparatus as claimed in claim 1, wherein:
   said measuring tube inflow- and/or outflow side is free of flanges.

7. The apparatus as claimed in claim 1, wherein:
   at least said receiver transducer element and/or said exciter transducer element are/is arranged at least partially in said separating unit.

8. The apparatus as claimed in claim 1, wherein:
   said measuring tube is embodied as one piece.

9. The apparatus as claimed in claim 1, wherein:
   said measuring tube is essentially composed of at least two tube halves.

* * * * *